United States Patent [19]

Schonfeld et al.

[11] 4,083,901

[45] Apr. 11, 1978

[54] METHOD FOR CURING POLYURETHANES

[75] Inventors: Steven Edward Schonfeld; Georg Gustav Anton Bohm, both of Akron; Michael William Hayes, Canton, all of Ohio

[73] Assignee: The Firestone Tire & Rubber Company, Akron, Ohio

[21] Appl. No.: 608,936

[22] Filed: Aug. 29, 1975

[51] Int. Cl.² .............................................. H05B 9/00
[52] U.S. Cl. .............................. 264/25; 260/77.5 A; 260/77.5 AN; 260/77.5 AP; 264/26; 264/236; 264/347; 264/DIG. 46; 264/DIG. 77
[58] Field of Search ................... 264/25, 26, 347, 349, 264/DIG. 42, DIG. 46, DIG. 65, DIG. 77, 236; 260/77.5 AP, 77.5 AN, 77.5 A

[56] References Cited

U.S. PATENT DOCUMENTS

| | | | |
|---|---|---|---|
| 3,294,879 | 12/1966 | Jacobs | 264/26 |
| 3,420,923 | 1/1969 | Ashworth et al. | 264/26 |
| 3,482,004 | 12/1969 | Anderson | 264/25 |
| 3,662,043 | 5/1972 | Rubens | 264/26 |
| 3,737,488 | 6/1973 | Porter et al. | 264/26 |
| 3,755,261 | 8/1973 | Van Gulick | 260/47 EN |
| 3,917,792 | 11/1975 | Conacher, Jr. | 264/328 |

Primary Examiner—Jeffery R. Thurlow

[57] ABSTRACT

Disclosed is a process for the uniform cure of polyurethane elastomers including the steps of mixing polyurethane prepolymers, having free isocyanate groups, with a stable curing agent complex to form a blend, thereafter transferring it to a suitable mold and subjecting it to a predetermined amount of microwave energy until it is substantially cured.

7 Claims, No Drawings

METHOD FOR CURING POLYURETHANES

BACKGROUND OF INVENTION

The present invention relates to a method for the cure of polyurethane elastomers by the use of microwave energy. Conventionally, these elastomers have been prepared by combining a suitable polyol, an isocyanate such as toluenediisocyanate and a curative such as 4,4'-methylene-bis (2-chloroaniline) (Moca) with subsequent heating to complete the curing step. Processing of such a system has posed a problem inasmuch as the reactants are readily cured in the presence of Moca to such an extent that curing commences during blending. Premature curing of the system during mixing and milling, greatly diminishes the available time for forming, increases molding problems and can result in inferior products. Obviously, it has not been feasible or possible to pre-blend such a mixture for subsequent forming operations and therefore, the shelf-life of such a system has been virtually non-existent.

It has recently been found and is taught by U.S. Pat. No. 3,755,261, that these elastomers, e.g., isocyanatoterminated polyurethane prepolymers may be cured with complexes of methylene dianiline and a halide salt such as sodium chloride. Such curing of the prepolymers is effected by heating a blend of prepolymer and complex to a temperature at which the complex liberates methylene dianiline which then acts as a conventional polyurethane curative. Below the liberation temperature, the blend is stable to polymerization or any premature reaction which is a favorable advantage over the foregoing system.

In order to cure the prepolymer/complex blend it has been conventional practice to heat it by the use of a preheated mold, hot presses or ovens employing heated fluids or air, or by infared heating. Commercially available processing units permit metering of components, subsequent mixing, vacuum degassing and a careful control over the temperature so that the prepolymer/curative blend may be heated to a range near the curing temperature in order to decrease the molding time as well as minimize molding problems.

A chief problem encountered with such a process has been that as the elastomer begins to cure, usually in the peripheral areas immediately adjacent the curing fluid or other source of heat, it becomes increasingly difficult for the heat to pass through the cured thicknesses to the inner yet uncured portions where the methylene dianiline has not yet been liberated by the heat. Continued curing time, which may ultimately produce a totally cured solid, also produces a gradient product which often possesses high internal stresses and strains which can result in premature failure, wear or other undesirable properties. Moreover, the outer surface of the product is often subjected to overcuring with accompanying deleterious effects. Lastly, due to the recognized poor heat transfer of these compositions, curing time is necessarily slow which often adversely affects the quantity of production per unit time as well as the cost of the product.

The foregoing problems are rather closely related to the curing problems experienced with rubber and other materials. In addition to the more conventional energy sources for curing, it is generally known that some rubber articles and foam materials can be cured by subjecting them to microwave energy. Because the microwaves can penetrate to the center of the substance being cured, much of the former problems of layering in the final product may be eliminated. One such process utilizes microwave heating to cure foams of compounded latexes and is described in U.S. Pat. No. 3,737,488. However, neither that patent nor any other known to us describes a process for curing polyurethane elastomers via microwave energy.

SUMMARY OF THE INVENTION

It is therefore an object of the present invention to provide a method for the microwave curing of polyurethane elastomers from stable prepolymer/curative blends.

It is another object of the present invention to provide a method for the relatively quick chain extension of polyurethane elastomers to produce a uniform, non-layered product.

It is yet another object of the present invention to provide a method whereby a heterogeneous polyurethane prepolymer/curative blend can be heated rapidly to liberate the curing agent which autocatalytically sustains the curing reaction without requiring costly amounts of heat expended over relatively long periods of time thereby permitting a more economical product.

It is still another object of the present invention to overcome the poor heat transfer of partially cured solid polyurethanes which occurs when conductive curing is employed.

It is a further object of the present invention to provide a method whereby polyurethanes may be cured with a minimization of internal stress and strains in the final product.

These and other objects of the present invention, together with the advantages thereof over existing and prior art forms which will become apparent from the following specification, are accomplished by the means hereinafter described.

In general, a method for the uniform cure of polyurethane elastomers includes the steps of mixing a polyurethane prepolymer, having free isocyanate groups, with a stable curing agent complex which contains a releasable curative to form a blend, transferring the blend to a suitable mold and then subjecting the blend to microwave energy of predetermined amount to cause release of the curative. The microwave energy is thereafter maintained until the blend is substantially cured.

DESCRIPTION OF THE PREFERRED EMBODIMENT

Polyurethane prepolymers which may be employed in the present invention include those which are terminated by isocyanate groups and are all generally well known and include polyesters, polyethers such as polytetrahydrofuran and polymeric diols such as dihydroxy polybutadiene. Examples of isocyanate terminated prepolymers which can be cured by diamines may be found in *Polyurethanes, Chemistry and Technology*, J. H. Saunders and K. C. Frisch, Interscience Publishers, XVI, 1964 pps. 301-02. A common number average molecular weight of such prepolymers ranges from 400 to about 6000 with 1000 being preferred.

The preferred curing agent complex comprises tris (methylene dianiline)-NaCl complexes which release the curative methylene dianiline as the complex is subjected to an increase in temperature. Examples of such complexes have been set forth in the aforementioned U.S. Pat. No. 3,755,261, the subject matter of which is hereby incorporated by reference.

In addition to the prepolymer and complex in the blend, other ingredients such as plasticizers, fillers, antifoamants and colorants may be added thereto depending upon the desired physical properties of the resulting elastomeric product. Promoters may also be added and these would include polar compounds which have a tendency to absorb microwave energy. Generally, the amount of microwave energy absorbed by these compounds will depend upon the number and strength of the dipoles present; interaction with the microwave field being directly proportional to these parameters.

The microwave frequency which may be conveniently employed lies within a range from 896 MH$_z$ to about 2450 MH$_z$ with the latter frequency being preferred. The required power lies within a range of from 0.5 kilowatt to approximately 100 kilowatts and will usually vary, depending upon thickness and weight of the blend and the number and strength of dipoles present in the material. Similarly, the cure time will vary, generally on the order of between 0.05 to 10 minutes or more depending again upon the dipoles, the specific thickness and weight of a given blend and the power of the microwave unit.

As is known in the art, the mold selected for cure of the blend must be constructed from a material which is transparent for microwave energy and will therefore generally include materials such as teflon, glass and Dienite which is a high 1,2-polybutadiene thermosetting resin. Dienite is a registered Trademark of The Firestone Tire and Rubber Company. Additionally, it may be necessary with some molds to supply some external heat to the outer mold surfaces in order to insure adequate curing of the peripheral areas of the elastomeric product thereby effecting a uniform cure. It would also be possible to employ a non-transparent material as a component of the mold which would absorb some of the microwave energy passing through it resulting in the heating of the mold at a rate comparable to that of the blend contained therein, thereby eliminating poor curing in the peripheral areas of the mold, and the need for an additional heat source for the mold.

According to the preferred process of the present invention, the prepolymer/complex blend is first thoroughly mixed, with a suitable plasticizer if desired, via mechanical agitation until it has been thoroughly degassed. The blend may also be heated at this time in order to bring it closer to the temperature at which the curative can be released. The blend is subsequently transferred into a mold or other suitable container, unless it is feasible to mix it in such a container initially, which is then placed into the microwave unit. Power fed to the unit is carefully regulated to permit the temperature of the blend to rise sufficiently for the curative to be released where it quickly promotes curing by chain extension of the prepolymer units. Temperature determination and maintenance, which may be facilitated by inserting a thermocouple into the blend, is important inasmuch as too great a rise will promote undesirable side reactions in the blend which will likely result in undesirable cross-linking by allophanate or biuret formation. The blend remains in the unit, with monitoring of the temperature, until totally cured at which time it is removed from the unit and the mold or container. The temperature of the complex at which the curative is effectively released is in the range of from 100° C to about 130° C with 120° C being preferred. Temperatures of approximately 165° C and higher, at which the complex melts, tend to favor the undesirable side reactions.

In a specific example a polytetrahydrofuran prepolymer containing 6.35% of free isocyanate was mixed with 20 parts of dioctyl phthalate, as a plasticizer, and 102.5% of the theoretical amount of tris (methylene dianiline) — NaCl complex salt necessary to cure the polymer, all parts being by weight percent. The blend was stirred at 25° C and 3 mm. Hg vacuum for 1 hour to degas it and was subsequently poured into a pyrex beaker.

The beaker and its contents were thereafter placed in a Sharp R5000 microwave oven which supplies 2450 MH$_z$ energy at a constant 550 watts AC power output. Temperature was monitored by intermittently inserting a thermocouple into the blend. In 75 to 90 seconds, 50 grams of the blend had reached 150° C and were cured substantially solid. The material in contact with the glass surface of the beaker was the last to cure.

Additional samples were prepared, having a similar blend composition, and were exposed to a microwave source supplying 2450 MH$_z$ at 1200 watts for time periods of up to 6 minutes. Tests were made to determine 300% modulus, tensile strength and elongation at break of the elastomeric compound at various periods of exposure to the microwave source and these have been presented and compared in Table I with test results taken on the same elastomeric compound subjected to conventional heat cure at a temperature of 120° C for a period of 120 minutes. The results set forth in Table I indicate that a satisfactory microwave cure was effected within 4 minutes.

TABLE I

| | Microwave Cure | | | Heat Cure |
|---|---|---|---|---|
| | 2 min. | 4 min. | 6 min. | |
| 300% Modulus (psi) | 2000 | 2000 | 2050 | 1975 |
| Tensile Strength (psi) | 3650 | 4550 | 3700 | 4880 |
| Elongation at Break (%) | 450 | 500 | 490 | 575 |

The effect of microwave exposure on the temperature rise for the individual components of the foregoing examples was measured and demonstrated that the temperature rise for each was different. Accordingly, the isocyanate terminated polytetrahydrofuran prepolymer heated up faster than the complex. The blend being heterogenous, it is believed that the faster temperature rise in the prepolymer promotes diffusion of the diamine for subsequent reaction of it with more prepolymer than is encountered in heat curing, assuming an equal average temperature of both samples.

Thus, exposure to heat to raise the temperature of the blend, prepolymer and complex alike, to approximately 120° C will promote chain extension; however, exposure of the blend to microwaves not only raises the temperature of the curative sufficiently to release methylene dianiline, but concurrently raises the temperature of the surrounding prepolymer even higher, effecting release and diffusion of the diamine throughout the prepolymer, where the temperature may not be as high.

A prepolymer which has been found to heat up slower than the complex, such as an isocyanate terminated dihydroxy polybutadiene, is also readily chain extended by the complex during exposure to microwaves, in which instance the temperature of the overall blend may be lower than that at which the methylene dianiline is released. If desired, the temperature of the blend may be raised merely by the addition of a suitable polar compound which, as discussed hereinabove, absorbs microwave energy with attendant increases in temperature. Thus, temperatures for various prepolymer blends may vary and, so long as the temperature of the complex is sufficiently raised to release the methylene dianiline, chain extension shall proceed rapidly.

It can thus be seen that the disclosed invention carries out the objects of the invention set fourth above. As will be apparent to those skilled in the art, many polyurethane elastomers can be prepared without departing from the spirit of the invention herein disclosed and described, the scope of the invention being limited solely by the scope of the attached claims.

We claim:

1. A method for the uniform cure of solid polyurethane elastomers comprising the steps of:

mixing a polyurethane prepolymer, containing free isocyanate groups, with a stable curing agent complex, containing a releasable curative to form a heterogenous blend wherein said complex consists of methylene dianaline and a halide salt;

transferring the blend to a suitable mold; exposing said blend in said mold to a predetermined amount of microwave energy sufficient to cause release of said curative; and, thereafter maintaining said predetermined amount of energy until said blend is substantially cured.

2. A method for the uniform cure of solid polyurethane elastomers, as set forth in claim 1, including the additional step of:

applying heat to said blend during said mixing step to raise the temperature thereof to a desired degree below the temperature at which said curative is released.

3. A method for the uniform cure of solid polyurethane elastomers, as set forth in claim 1, including the additional step of:

applying heat to the exterior surfaces of said mold.

4. A method for the uniform cure of solid polyurethane elastomers, as set forth in claim 1, wherein said predetermined amount of microwave energy is selected by varying the frequency and power of the microwave unit and the period of time for which said blend is subjected thereto and is variable depending upon the polar nature of the various components within said blend, the thickness of the desired polyurethane elastomer and the orientation of the blend within the microwave field.

5. A method for the uniform cure of solid polyurethane elastomers, as set forth in claim 1, wherein said polyurethane prepolymers containing free isocyanate groups are selected from the group consisting essentially of:

polyesters, polyethers and polymeric diols.

6. A method for the uniform cure of solid polyurethane elastomers, as set forth in claim 5, wherein said prepolymer is polytetrahydrofuran.

7. A method for the uniform cure of solid polyurethane elastomers, as set forth in claim 1, wherein said mold is formed from components at least one of which is non-transparent to microwave energy, whereby the temperature of said mold will increase at a rate comparable to that of said blend contained therein while said mold and said blend are subjected to said microwave energy.

* * * * *